(12) United States Patent
Stone

(10) Patent No.: US 8,838,987 B2
(45) Date of Patent: Sep. 16, 2014

(54) NON-NUMERIC PERSONAL IDENTIFICATION

(75) Inventor: Carl Stone, Campbell, CA (US)

(73) Assignee: Ebay Inc., San Jose, CA (US)

( * ) Notice: Subject to any disclaimer, the term of this patent is extended or adjusted under 35 U.S.C. 154(b) by 683 days.

(21) Appl. No.: 12/730,567

(22) Filed: Mar. 24, 2010

(65) Prior Publication Data

US 2011/0239272 A1   Sep. 29, 2011

(51) Int. Cl.
*G06F 21/00* (2013.01)
*G06F 21/31* (2013.01)
*G06F 21/36* (2013.01)

(52) U.S. Cl.
CPC ............ *G06F 21/31* (2013.01); *G06F 21/36* (2013.01)
USPC .......................................................... 713/183

(58) Field of Classification Search
None
See application file for complete search history.

(56) References Cited

U.S. PATENT DOCUMENTS

| | | | |
|---|---|---|---|
| 5,345,549 A * | 9/1994 | Appel et al. | 715/741 |
| 5,428,349 A * | 6/1995 | Baker | 340/5.54 |
| 6,209,104 B1 * | 3/2001 | Jalili | 726/18 |
| 6,658,574 B1 * | 12/2003 | Anvekar | 726/16 |
| 7,243,239 B2 * | 7/2007 | Kirovski et al. | 713/184 |
| 8,117,458 B2 * | 2/2012 | Osborn, Iii et al. | 713/183 |
| 2005/0044425 A1 * | 2/2005 | Hypponen | 713/202 |
| 2009/0172810 A1 * | 7/2009 | Won et al. | 726/19 |

* cited by examiner

*Primary Examiner* — Benjamin Lanier
(74) *Attorney, Agent, or Firm* — Haynes and Boone, LLP

(57) ABSTRACT

Various methods and systems are provided for allowing a user to select a non-numeric PIN or password and use that to access content instead of a conventional numerical PIN. A series of visual, textual, and/or audio "digits" form the PIN, where each succeeding digit may be related to one or more of the preceding digits.

12 Claims, 4 Drawing Sheets

NON-NUMERIC PERSONAL IDENTIFICATION

BACKGROUND

1. Field of the Invention

The present invention generally relates to personal identification and in particular to non-numeric personal identification.

2. Related Art

When conducting different types of transactions, either in person or over a network, a user is typically required to enter a personal identification number (PIN) or password to identify or authenticate the user. For in-person transactions, a user may present or enter account information of a payment instrument, such as a debit card, and then enter a PIN into a numerical keypad. Typical PINs are a sequences of four numbers, although the length may differ and symbols/characters/letters may also be used, either alone or in combination. If the PIN matches the user's account information, the user and financial instruction is validated/authenticated, and the transaction continues or completes.

Even though PINs are still used for in-person transactions, a vast majority of PIN use is with transactions over a network, such as the Internet or other communication medium. Typically, the user access a website, such as of a financial institution, merchant, retailer, on-line market place, social network, payment provider, or any other site that requests a PIN or password for access to the user's account or information. Access can be through almost any computer device, e.g., a PC, laptop, smart phone, PDA, etc. Once a site is accessed, the user is typically requested to enter one or more identifiers, such as a PIN or password, through the user device, which again is normally a series of numbers, but can also be characters, symbols, and or letters.

Such random sequences of numbers, characters, symbols, and/or letters make it increasingly difficult for the user to remember PINs as the number of different PINs increases. Therefore, many users use the same PIN for most, if not all, of the user's accounts. However, while easy to remember, this practice is not the most secure. This is because if the user's PIN is discovered, all of the user's accounts may be compromised.

Therefore, a need exists for users to authenticate or identify themselves that overcomes the disadvantages mentioned above.

SUMMARY

According to one embodiment of the disclosure, a sequence of non-numeric "digits" are used to create a PIN. The length of the sequence can be two or more "digits." The "digits" comprising the PIN are words or pictures. In one embodiment, each successive digit is a further limiter of the one preceding. For example, with a three-digit PIN, the first digit may be a category or subject, such as food, the second digit may be a type of food, such as fruit, and the third digit may be a type of fruit, such as mango. Other examples of different types of digits include colors, vegetables, cars, shapes, furniture, utensils, clothing, desserts, etc. In other embodiments, the digits are related, but not successive limiters, or are unrelated to each other. The digits may be presented as words, pictures, videos, animation, or sounds.

When accessing a site or creating an account, the user may be asked to select a PIN or password as part of the process. The user may be asked to choose a first digit, such as from a drop-down menu, wheel, or other type of listing or grouping. Next, the user is asked to choose a second digit based on what was selected for the first digit. This continues until the desired number of digits is selected by the user. Note that in other embodiments, the second and/or any other successive digits need not be based on a preceding selected digit. Once the PIN is selected, the user may be asked to confirm the selection. This PIN is then stored and associated with the user/account, such that when the user desires to access or log into a site or account, the user will be asked to enter the selected PIN.

Using a non-numeric PIN as described provides advantages over conventional numeric PINs. For example, a non-numeric PIN may be easier for the user to remember because of the visual nature of the PIN and, in some embodiments, the relationship between the digits. The non-numeric PIN may also provide greater security for the user due to the larger number of combinations for the PIN when the number of choices for the digits is greater than 10 (which is the number available for numeric PINs, e.g., 0 to 9).

These and other features and advantages of the present invention will be more readily apparent from the detailed description of the embodiments set forth below taken in conjunction with the accompanying drawings.

Figure 1:
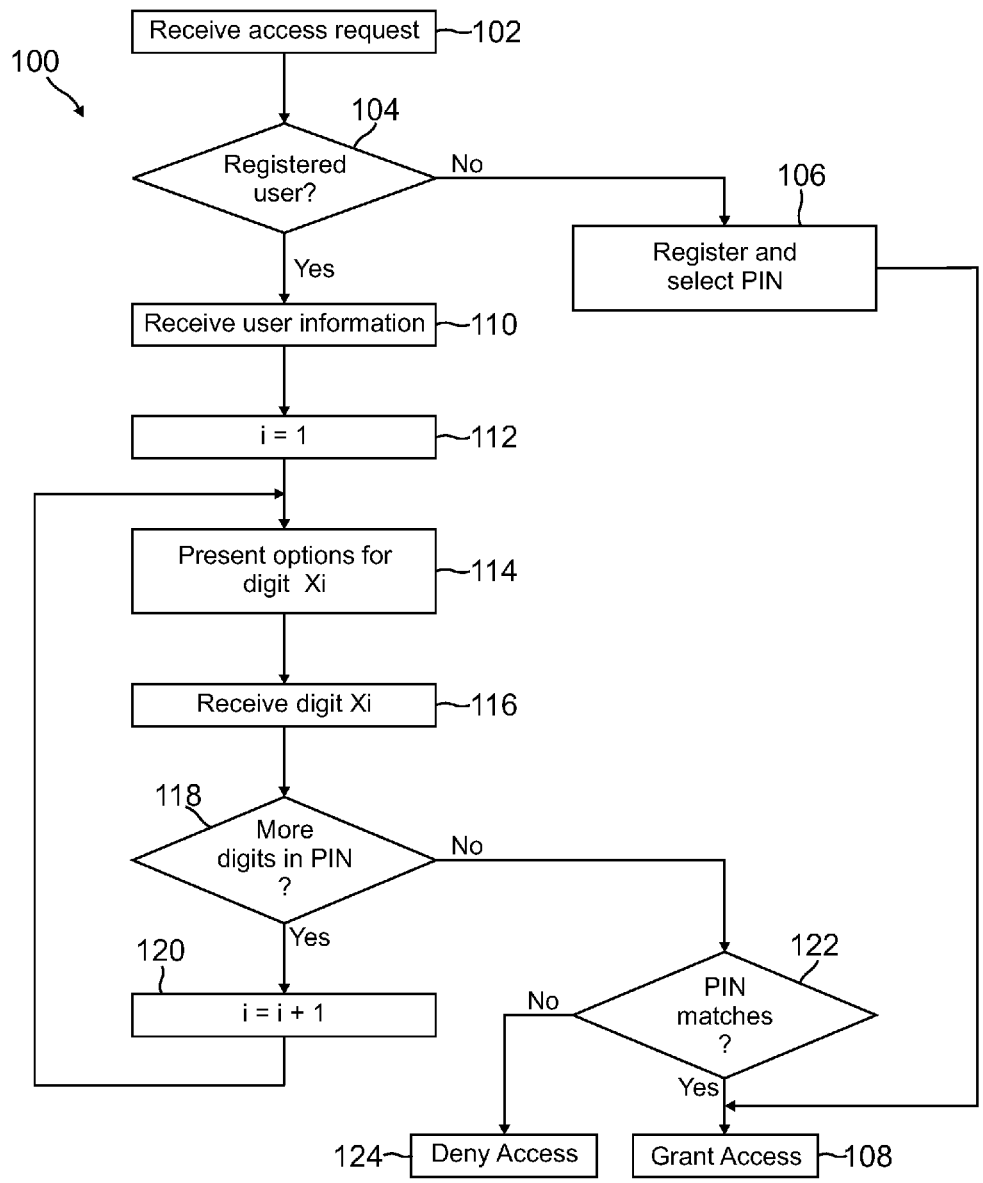
FIG. 1 is a flowchart showing a process an entity performs for granting access to a user through a non-numeric PIN according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process an entity performs for granting access to a user through a non-numeric PIN according to one embodiment of the present disclosure. The entity may be any type of system attempting to authenticate a user, such as a financial institution, a payment provider (e.g., PayPal, Inc. of San Jose, Calif.), a merchant or retailer site, an on-line marketplace, a social networking site, a hospital, a government agency, etc. At step 102, the entity receives an access request from the user. This may be accomplished by the user entering in a URL or website address on a user device, such as a PC, smart phone, laptop, or other computing device. A communication medium allows access to the desired site, such as through the Internet via a wired or wireless connection. The access request may be to access non-public information stored in or provided by the site, such as a user's account or medical information, associated with the user.

Once the access request is received, a determination is made at step 104 whether the user is registered with the entity or system. This may be done in any number of suitable ways, including checking device or user information conveyed with the request, such as a phone number, email address, or user name. The information may be conveyed automatically with the transmission or entered by the user prior to transmission. This information is checked to see if the user associated with the information is registered with the system or entity. In other embodiments, the user is simply asked if he is a first-time user or is registered.

If the user is not registered, the user is requested to register and select a non-numeric PIN or password at step 106. Details of this step will be discussed with respect to FIG. 2. Once the user is registered with a non-numeric PIN, access is granted at step 108. Access can be for any content that the site requires a user identifier to view or edit.

If, as determined at step 104, the user is already registered with the site, user information is received at step 110. This user information may be anything required or requested by the entity that was not received at step 102. For example, the user may be requested to enter a username, email address, or other identifier. Using this information, the user may be identified as someone having previously registered with the system. If the user information does not match up with any previously registered user, the user may be asked to re-enter or enter new user information. Once the user is identified, a counter is set to one at step 112 to start the process for receiving a non-numeric PIN from the user.

At step 114, the user is presented with options for the first digit of the PIN. For example, the user may be presented with a drop down menu, wheel, or other type if display showing the user different options available for the first digit. In one embodiment, the options are the same for all users registered with the system, entity, or website. The options may be a plurality of general categories or subjects, such as food, cars, clothing, cities, states, countries, colors, shapes, movies, actors, television shows, etc. This may be shown to the user on the user device from display that allows the user to select one of the options, such as clicking or tapping on the option or placing a check mark next to the desired option. The options may be presented as words, sounds, video, animation, and/or other visual representations, such as images. In this example, the user selects "movies." The selection may then be shown to the user. Note that "digit" refers to any non-numeric representation, such as an image, a word or phrase, a picture, an audio clip, a color, animation, video, etc.

The user-selected first digit is then communicated to and received by the system at step 116. A determination is made at step 118 whether there are more digits in the PIN. Typically, there are at least two digits that make up the PIN, such as three digits in one embodiment. In another embodiment, the PIN may be a single digit. If there are more digits in the PIN than what the system has received from the user, the counter is incremented by one at step 120, and a different set of options for the next digit is presented to the user at step 114.

In one embodiment, the different set of options is based on what was received previously from the user, although succeeding set of options may also be unrelated. For example, if the user selected "movies" as the first digit, the options for the second digit may be different movie titles, such as Avatar, The Godfather, The Sound of Music, Scarface, Casablanca, The Wizard of Oz, Top Gun, Halloween, Saw, Up, Toy Story, etc. Again, the set of options may be presented as words and/or visual images (e.g., a movie poster to display movie titles). The user then selects the second digit from the list, which is received by the system at step 116. Continuing the example, the user may select "The Sound of Music." At this point, the user has selected "movies" "The Sound of Music" as the non-numeric PIN. Note that in one embodiment, the previous selection(s) remain on the page, such that "movies" remains on the display while the user is presented with the next set of options.

If the PIN length is three digits, the user is presented with a third set of options at step 114. The third set of options may also be based on what was received previously, which may be just the first digit, the second digit, or both. In one embodiment, if the third set of options is based only on the first digit, the user may be presented with a different list of movie titles for the third digit, although the list may include some or all of the same titles as from the previous list.

With the example above, the third set of options may be different people, songs, images, and other descriptors from "The Sound of Music." This may include Julie Andrews, Maria, Christopher Plummer, "My Favorite Things," "Sixteen Going on Seventeen," Max, "Do-Re-Mi," Salzburg, Von Trapp, nuns, and abbey. This set of options may also be presented as words and/or visual images. Note that if appropriate, an audio file may also be used, such as when presenting audio clips or songs. In the above example, the user may select "Max." If the PIN requires additional digits, another set of options may be presented to the user, such as different roles the actor playing "Max" has taken, different movies or shows the "Max" actor has been in, physical or character descriptors of Max, etc. The different options can continue until the desired number of digits has been reached, with all of the previous input digits shown, while the current set of options are displayed for selection.

For exemplary purposes, after the user has selected "Max" and "Max" has been received by the system, there are no more digits in the non-numeric PIN, as determined at step 118. Thus, for this PIN, there are three digits: "movie" "The Sound of Music" "Max."

When the final digit is received by the system, a determination is made at step 122 whether the received non-numeric PIN matches the non-numeric PIN stored for the user. If one or more of the digits to not match, access is denied for the user at step 124. A message to the user may be transmitted, such as an indication of incorrect password or PIN. In different embodiments, the user may be asked to enter the PIN again and be given a predetermined amount of attempts.

If the received PIN matches the stored PIN, the user is granted access at step 108, which may include access to the user's account, private information, non-public content on the site, etc. A final image or display may also be shown to the user if the PIN was correct, e.g., a picture of Max from a Sound of Music scene in the above example, along with an indication that the PIN was accepted or confirmed.

Figure 2:
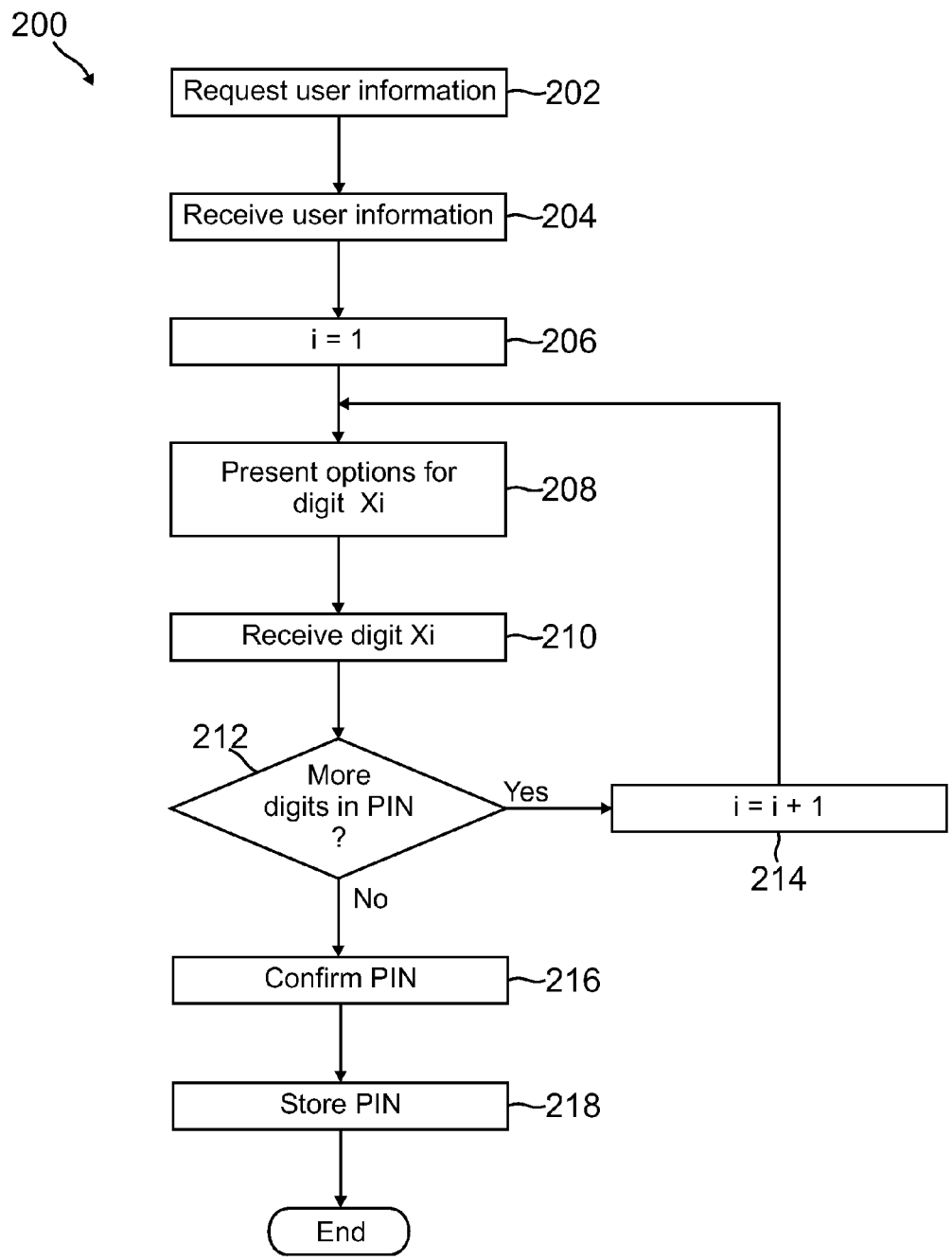
FIG. 2 is a flowchart showing a process an entity performs for registering a user with a non-numeric PIN according to one embodiment.

FIG. 2 is a flowchart 200 showing a process an entity performs for registering a user with a non-numeric PIN, such as at step 106 of FIG. 1, according to one embodiment. After the user is on a site and is not registered (e.g., does not have an account) with the site, the user is asked for information to register at step 202. The information requested may vary depending on the site. For example, with a payment provider, financial institution, or shopping site, the user may be asked for funding instrument information, such as account number, billing address, security code, date of birth, social security number, and/or expiration date, along with user identification information, such as an email address, name, user name, phone number, etc. Other sites may simply request user identification information. This may be provided through a screen displaying fields where the user enters the requested information.

Once entered, the user transmits the information, such as by clicking a send or enter button, to the site. At step 204, the requested information is received by the site. A counter is initialized to one at step 206 to start the PIN selection process. Thus, once the site receives the requested user information, the site presents the user with a set of options, at step 208, for selecting the first digit of the PIN. This may be similar to step 114 in FIG. 1. For example, the user may be presented with a drop down menu, wheel, or other type if display showing the user different options available for the first digit, such as general categories or subjects. This may be shown to the user on the user device from display that allows the user to select one of the options, such as clicking or tapping on the option or placing a check mark next to the desired option. The options may be presented as words and/or visual representations, such as images.

The user-selected first digit is then communicated to and received by the system at step 210, which may be similar to step 116 in FIG. 1, where it is stored or buffered. This process continues, at steps 212 (whether the length has been reached), 214 (incrementing a PIN counter of not), 208 (presenting the next set of options), and 210 (receiving the user selected option), until the desired length of the PIN is reached. Note that as with FIG. 1, each succeeding set of options for the user to choose from may depend on the one or more preceding digits, although in some embodiments, succeeding sets of options may be independent from each other. Each selected digit of the PIN may be displayed on the same page as the current set of options for the user to choose from.

Once the final digit of the PIN has been received and stored by the system, the PIN is confirmed at step 216. Confirmation may be accomplished through different steps or altogether skipped of desired. In one example, the user is shown the PIN stored by the system and asked to confirm that what is shown is the intended PIN, such as by the user clicking or selecting a button or placing a check mark by a button. In another example, the user is asked to select the PIN in sequence again, similar to numeric PINs where the user is asked to re-enter the PIN. If the re-entered PIN matches what was stored, the PIN is confirmed. If the system cannot confirm the just-entered and stored PIN for whatever reason, the user may be asked to select a PIN again through steps 206-214.

Once the user PIN is confirmed, the PIN is stored at step 218. The PIN is associated with the user, such as through an email, phone number, account number, or other user identifier. The PIN may be stored locally on a server or off-site, where the PIN is accessible for comparison with a user-entered PIN when needed, such as if a user attempts to access a site using a non-numeric PIN.

Figure 3:
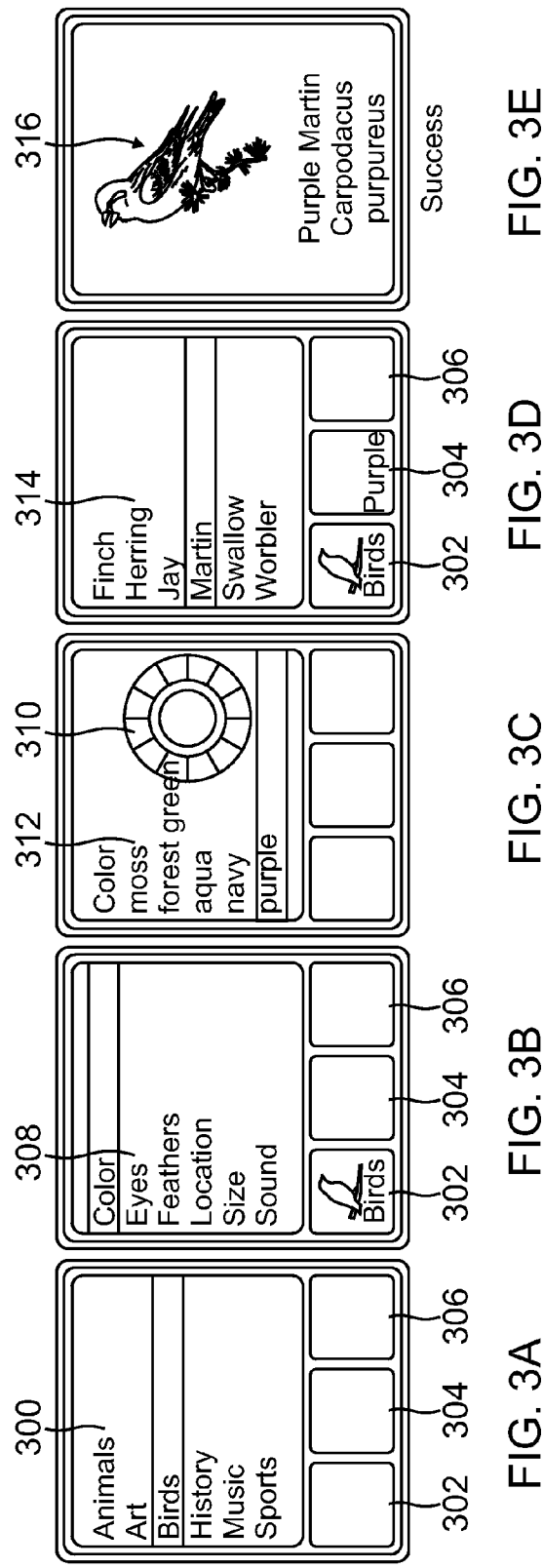
FIGS. 3A-3E are exemplary displays showing a process for entering or selecting a numeric PIN or password according to one embodiment.

FIGS. 3A-3E are exemplary displays showing a process for entering or selecting a numeric PIN or password as discussed herein. In FIG. 3A, the user is shown a menu of categories 300 for the first digit of the PIN. The options are shown in the form of a list. Below the list of categories 300 are three fields 302, 304, and 306 representing the three "digits" in the PIN. All fields are blank because no digits have been entered. The user selects the category of "Birds" as the first digit of the PIN, such as by clicking on the selection. Next, the user sees the display of FIG. 3B, which shows a next set of options 308 based on the first selected digit of "Birds," where the first selected digit is shown to the user along with options 308. Both a visual representation and the word of "Birds" are shown in field 302. In this example, the user next selects "Color" as the second digit of the PIN.

Next, in FIG. 3C, the use is shown a color wheel 310 and a list of colors 312. The user can then select a specific color, either from the color wheel or the list. Note that in this example, the user actually selects a new category before selecting the second digit of the PIN, as opposed to the embodiments of FIGS. 1 and 2, in which each new set of options presented is a new digit for the PIN. Here, options 308 is not a digit, but just a precursor for the options for the next digit. In FIG. 3C, the user selects the color purple as the next digit, which may be highlighted in the list and on the color wheel and shown in the center circle of the color wheel.

Once the second digit is selected, e.g., "purple," the user is shown a list of purple birds 314 in FIG. 3D. The user is also shown the first two selected digits, i.e., a bird in field 302 and the color purple in field 304. In FIG. 3D, the user selects "Martin" for the third digit. Thus, at this point, the user has selected a non-numeric PIN of "Birds" "Purple" "Martin." A visual and textual representation is shown in FIG. 3E. Note that the user may be shown a bird in field 302, the color purple in field 304, and a Martin (or purple Martin) 316 in field 306.

If the user is first selecting a non-numeric PIN, the user may then be asked to confirm that what is shown is correct and desired. The user may alternatively be asked to re-enter the non-numeric PIN by repeating the earlier process. If the user is entering the PIN to access a site, the user may be given an indication that the non-numeric PIN was correct (e.g., "Success") or incorrect ("Try Again").

Figure 4:
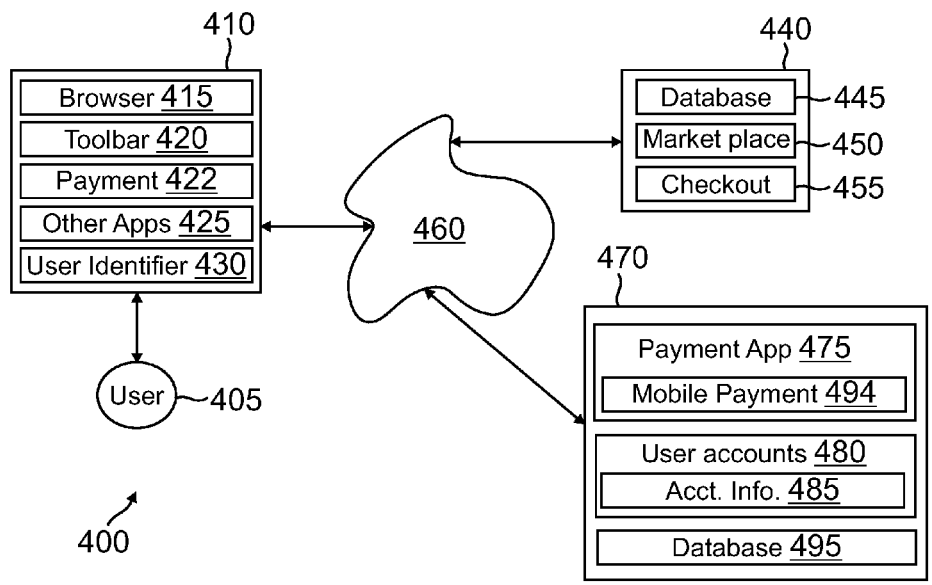
FIG. 4 is a block diagram of a networked system using a non-numeric PIN in accordance with an embodiment of the invention.

FIG. 4 is a block diagram of a networked system 400 configured to handle a transaction using a non-numeric PIN, such as described above, in accordance with an embodiment of the invention. System 400 includes a user or consumer device 410 associated with a user 405, a merchant server 440, and a payment service provider server 470 in communication over a network 460. Payment service provider server 470 may be maintained by a payment provider, such as PayPal, Inc. of San Jose, Calif.

User device 410, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

User device 410 may be implemented using any appropriate combination of hardware and/or software configured for wired and/or wireless communication over network 460. For example, in one embodiment, user device 410 may be implemented as a smart phone of user 405 in communication with the Internet, where user 405 is typically a person. In other embodiments, user device 410 may be implemented as a personal digital assistant (PDA), notebook computer, PC and/or other types of computing devices having an interactive display and capable of wireless computing, data transmission, and data receiving.

As shown, user device 410 may include one or more browser applications 415 which may be used, for example, to provide a convenient interface to permit user 405 to browse information available over network 460. For example, in one embodiment, browser application 415 may be implemented as a web browser configured to view information available over the Internet, such as from a merchant, shopping, financial, or content provider site. User device 410 may also include one or more toolbar applications 420 which may be used, for example, to provide client-side processing for performing desired tasks in response to operations selected by user 405. In one embodiment, toolbar application 420 may display a user interface for selecting or entering non-numeric digits of a PIN and/or in connection with browser application 415 as further described herein.

In addition, user device 410 may include a payment application 422 that enables payments to be processed, sent, received by the device. Payment processing may be with a merchant or individual.

User device 410 may further include other applications 425 as may be desired in particular embodiments to provide desired features to user device 410. For example, applications 425 may include security applications for implementing client-side security features, programmatic client applications for interfacing with appropriate application programming interfaces (APIs) over network 460, or other types of applications. Applications 425 may also include display and processing of text, audio, or visual images on the device display, such as the above-described display that allows the user to select and enter non-numeric digits for a PIN. User device 410 may include one or more user identifiers 430 which may be implemented, for example, as operating system registry entries, cookies associated with browser application 415, identifiers associated with hardware of user device 410, such as passwords, and PINs, or other appropriate identifiers, such as used for payment/user/device authentication. In one embodiment, user identifier 430 may be used by a payment service provider to associate user 405 with a particular account maintained by the payment service provider as further described herein.

Merchant server 440 may be maintained, for example, by an on-line merchant or shopping site offering various products and/or services in exchange for payment, which may be received over network 460. Merchant server 440 may include a database 445 identifying available products and/or services (e.g., collectively referred to as items) which may be made available for viewing and purchase by user 405. Accordingly, merchant server 440 also includes a marketplace application 450 which may be configured to serve information over network 460 to browser 415 of user device 410. In one embodiment, user 405 may interact with marketplace application 450 through browser applications over network 460 in order to view various products or services identified in database 445.

Merchant server 440 may also include a checkout application 455 configured to facilitate the purchase by user 405 of goods or services identified by marketplace application 450. Checkout application 455 may be configured to accept payment information from user 405 and/or from payment service provider server 470, through any number of different funding sources, over network 460. If desired, checkout application 455 or another application may also be configured to process or recognize non-numeric PINs from user 405 that is conveyed through user device 410 to merchant server 440. Note that merchant server 440 may be replaced with any suitable server maintained by an entity or system that requires a password or PIN from a user to access at least a portion of the system. Examples include financial institutions, medical companies, government agencies, social sites, education companies and institutions, and the like. Thus, servers would communicate content and other information based on authentication through a non-numeric PIN or password.

Payment service provider server 470 may be maintained, for example, by an online payment service provider which may provide payment on behalf of user 405 to the operator of merchant server 440 or to another user, such as for person to person payments. Payment service provider server 470 may include one or more payment applications 475 configured to interact with user device 410 and/or merchant server 440 over network 460 to facilitate the purchase of goods or services by user 405 of user device 410 from merchant server 440 or another user, as well as transfer money between entities or individuals.

Payment service provider server 470 also maintains a plurality of user accounts 480, each of which may include account information 485 associated with individual users. For example, account information 485 may include private or sensitive information of users of devices such as non-numeric PINs, account numbers, phone numbers, credit card information, bank information, or other financial information which may be used to facilitate online transactions by user 405. Advantageously, payment application 475 may be configured to interact with merchant server 440 on behalf of user 405 during a transaction with checkout application 455 to track and manage purchases or money transfers made by users.

Payment application 475 may include a mobile payment processing application 494 which may be configured to receive information from a mobile user device and/or merchant server 440 for storage in a payment database 495. Payment application 475 may be further configured to match data received from a mobile device with information stored in payment database 495 for payment authentication and processing. This data may include the user's device phone number, email, password, and/or non-numeric PIN.

Figure 5:
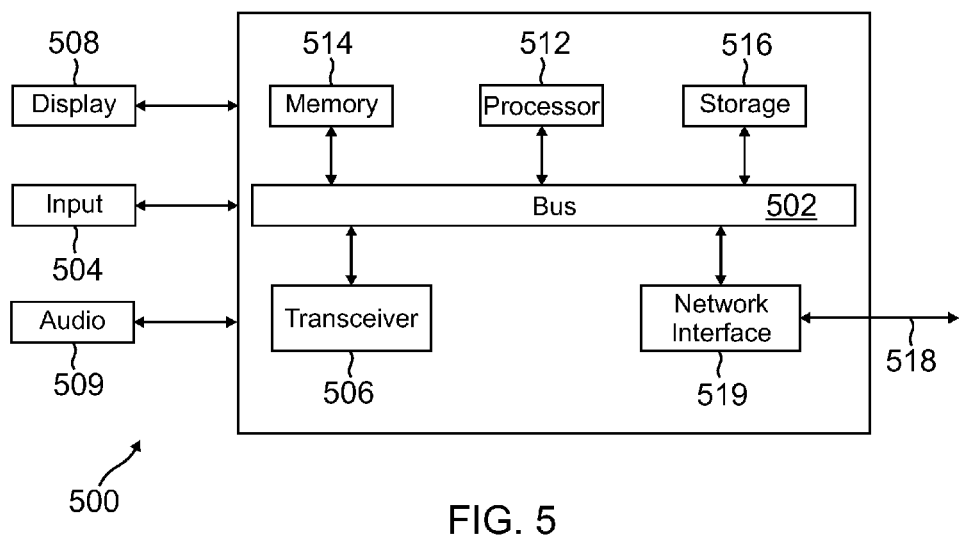
FIG. 5 is a block diagram of a computer system suitable for implementing one or more components according to one embodiment.

FIG. 5 is a block diagram of a computer system 500 suitable for implementing one or more embodiments of the present disclosure. In various implementations, the user device may comprise a personal computing device (e.g., a smart phone, laptop, personal computer, PDA, etc.) capable of communicating with the network. The merchant and/or payment provider may utilize a network computing device (e.g., a network server) capable of communicating with the network. It should be appreciated that each of the devices utilized by users, merchants, payment providers, and content providers may be implemented as computer system 500 in a manner as follows.

Computer system 500 includes a bus 502 or other communication mechanism for communicating information data, signals, and information between various components of computer system 500. Components include an input component 504 that processes a user action, such as selecting keys from a keypad/keyboard, selecting one or more buttons or links, etc., and sends a corresponding signal to bus 502. A transceiver 506 transmits and receives signals between computer system 500 and other devices, such as a merchant server, payment provider server, or another user device. In one embodiment, the transmission is wireless, although other transmission mediums and methods may also be suitable. A display 508, such as an LCD or touch screen, is suitable for displaying non-numeric digits, receiving a user-input or selected non-numeric digit, and processing the selection, such as described above. An optional audio component 509, such as a microphone, may process voice or audio signals, e.g., in making calls or speaking a non-numeric PIN digit(s). A processor 512, which can be a micro-controller, digital signal processor (DSP) or other processing component, processes various signals from display 508, audio component 509, input component 504 for transmission within computer system 500 or to other devices via a communication link 518 through a network interface 519.

Components of computer system 500 also include a system memory component 514 (e.g., RAM) and a static storage component 516 (e.g., ROM), which can be used to store non-numeric PINs or passwords associated with a user. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. Secure storage elements may be present within or apart from a main storage.

In various embodiments, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another, such as processing free-form actions performed by the user as part of a transaction process.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, selection of a non-numeric PIN was described above as being based on options provided to the user by the system. In other words, the user selects from a closed list of options. However, a non-numeric PIN may be selected from specific non-numeric digits from the user, such as downloaded or selected from the user. In addition, a non-numeric PIN may be used for purposes other than accessing content, such as confirming a user when a user has forgotten a password or identifier. This can be used in place of or in addition to security questions. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a memory storing user account authentication information, wherein the authentication information comprises a first non-numeric digit and a second non-numeric digit; and
one or more hardware processors coupled to the memory and configured for:
presenting a user with a first set of non-numeric options comprising word descriptors representing a plurality of categories for a first non-numeric digit;
receiving a user-selected first non-numeric digit comprising one of the word descriptors representing one of the plurality of categories;
presenting the user with a second set of non-numeric options comprising word descriptors representing a plurality of sub-categories within the one of the plurality of categories for a second non-numeric digit, wherein content of the second set of non-numeric options for the second non-numeric digit is dependent on content of the user-selected first non-numeric digit and is different than the content of the first set of non-numeric options;
receiving a user-selected second non-numeric digit comprising one of the word descriptors representing one of the plurality of sub-categories; receiving a user-selected third non-numeric digit, wherein content of the third non-numeric digit is dependent on the content of the second non-numeric digit; and
determining whether the received user-selected non-numeric digits match a stored non-numeric authentication for the user.

2. The system of claim 1, wherein the content of the third non-numeric digit is further dependent on the content of the first non-numeric digit.

3. The system of claim 1, further comprising at least a fourth non-numeric digit received from the user.

4. A method of authenticating a user, comprising:
presenting the user, electronically by a hardware processor of a service provider, with a first set of non-numeric options comprising word descriptors representing a plurality of categories for a first non-numeric digit on a user device;
receiving, from the user device, a user-selected first non-numeric digit comprising one of the word descriptors representing one of the plurality of categories;
presenting the user, electronically by the hardware processor, with a second set of non-numeric options comprising word descriptors representing a plurality of sub-categories within the one of the plurality of categories for a second non-numeric digit on the user device, wherein content of the second set of non-numeric options for the second non-numeric digit is dependent on content of the user-selected first non-numeric digit and is different than the content of the first set of non-numeric options;

receiving, from the user device, a user-selected second non-numeric digit comprising one of the word descriptors representing one of the plurality of sub-categories; presenting the user with a third set of non-numeric options for a third non-numeric digit; receiving a user-selected third non-numeric digit, wherein content of the third set of non-numeric options for the third non-numeric digit is dependent on the content of the user-selected second non-numeric digit; and determining, by the hardware processor, whether the received user-selected non-numeric digits match a stored non-numeric authentication for the user.

5. The method of claim 4, wherein the content of the third non-numeric options for the third non-numeric third is further dependent on the content of the user-selected first non-numeric digit.

6. The method of claim 4, further comprising:

presenting the user with a fourth set of non-numeric options for at least a fourth non-numeric digit; and receiving at least a user-selected fourth non-numeric digit.

7. A non-transitory machine-readable medium comprising a plurality of machine-readable instructions which when executed by one or more processors of a server are adapted to cause the server to perform a method comprising:

presenting the user with a first set of non-numeric options comprising word descriptors representing a plurality of categories for a first non-numeric digit;

receiving a user-selected first non-numeric digit comprising one of the word descriptors representing one of the plurality of categories;

presenting the user with a second set of non-numeric options comprising word descriptors representing a plurality of sub-categories within the one of the plurality of categories for a second non-numeric digit, wherein content of the second set of non-numeric options for the second non-numeric digit is dependent on content of the user-selected first non-numeric digit and is different than the content of the first set of non-numeric options;

receiving a user-selected second non-numeric digit comprising one of the word descriptors representing one of the plurality of sub-categories; presenting the user with a third set of non-numeric options for a third non-numeric digit; receiving a user-selected third non-numeric digit, wherein content of the third set of non-numeric options for the third non-numeric digit is dependent on the content of the user-selected second non-numeric digit; and determining whether the received user-selected non-numeric digits match a stored non-numeric authentication for the user.

8. The non-transitory machine-readable medium of claim 7, wherein the content of the third non-numeric options for the third non-numeric third is further dependent on the content of the user-selected first non-numeric digit.

9. The non-transitory machine-readable medium of claim 7, wherein the method further comprises:

presenting the user with a fourth set of non-numeric options for at least a fourth non-numeric digit; and receiving at least a user-selected fourth non-numeric digit.

10. The system of claim 1, wherein content of the second non-numeric digit further limits content of the first non-numeric digit.

11. The method of claim 4, wherein content of the second non-numeric digit further limits content of the first non-numeric digit.

12. The non-transitory machine-readable medium of claim 7, wherein content of the second non-numeric digit further limits content of the first non-numeric digit.

* * * * *